US012734380B2

(12) United States Patent
Kim et al.

(10) Patent No.: US 12,734,380 B2
(45) Date of Patent: Sep. 15, 2026

(54) BATTERY RACK, ENERGY STORAGE SYSTEM, AND POWER GENERATION SYSTEM

(71) Applicant: LG ENERGY SOLUTION, LTD., Seoul (KR)

(72) Inventors: Hee-Chan Kim, Daejeon (KR); Seung-Jun Lee, Daejeon (KR); Goan-Su Jung, Daejeon (KR); Kyung-Min Lee, Daejeon (KR); Kown Son, Daejeon (KR); Jong-Soo Lee, Daejeon (KR); Seung-Joon Jeon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 775 days.

(21) Appl. No.: 18/027,428

(22) PCT Filed: Sep. 17, 2021

(86) PCT No.: PCT/KR2021/012847
§ 371 (c)(1),
(2) Date: Mar. 21, 2023

(87) PCT Pub. No.: WO2022/075635
PCT Pub. Date: Apr. 14, 2022

(65) Prior Publication Data

US 2023/0330461 A1 Oct. 19, 2023

(30) Foreign Application Priority Data

Oct. 5, 2020 (KR) ........................ 10-2020-0128285

(51) Int. Cl.
*H02J 7/00* (2026.01)
*A62C 3/16* (2006.01)
(Continued)

(52) U.S. Cl.
CPC ................ *A62C 3/16* (2013.01); *A62C 35/68* (2013.01); *H01M 50/204* (2021.01); *A62C 31/005* (2013.01)

(58) Field of Classification Search
CPC ... H01M 50/204; H01M 6/5038; B60L 58/26; B60L 58/33
(Continued)

(56) References Cited

U.S. PATENT DOCUMENTS 6,613,472 B1 * 9/2003 Watanabe ......... H01M 10/6565 429/62
7,045,236 B1 * 5/2006 Andrew .............. H01M 10/613 429/83
(Continued)

FOREIGN PATENT DOCUMENTS

CA 209249548 U 8/2019
CN 107910606 A 4/2018
(Continued)

OTHER PUBLICATIONS

Extended European Search Report for European Application No. 21877887.6, dated Jun. 28, 2024.
(Continued)

*Primary Examiner* — Alexis B Pacheco
(74) *Attorney, Agent, or Firm* — Birch, Stewart, Kolasch & Birch, LLP

(57) ABSTRACT

A battery rack includes a plurality of battery modules that are arranged in a layered structure; a rack case configured to accommodate the plurality of battery modules; and a fire extinguishing agent supply member including a supply pipe configured to transport a fire extinguishing agent and extending along the plurality of battery modules, and a plurality of valves each configured to have one end portion connected to the supply pipe and the other end portion
(Continued)

connected to each of the plurality of battery modules from the supply pipe.

15 Claims, 7 Drawing Sheets

(51) Int. Cl.
*A62C 35/68* (2006.01)
*H01M 50/204* (2021.01)
*H02J 7/14* (2006.01)
*A62C 31/00* (2006.01)

(58) Field of Classification Search
USPC .......................................................... 320/132
See application file for complete search history.

(56) References Cited

U.S. PATENT DOCUMENTS

| | | | | |
|---|---|---|---|---|
| 11,850,970 | B2* | 12/2023 | Zhang | B60K 11/02 |
| 2006/0090492 | A1* | 5/2006 | Ahn | H01M 10/647 62/515 |
| 2007/0072061 | A1* | 3/2007 | Shimizu | H01M 10/6566 429/50 |
| 2011/0189511 | A1* | 8/2011 | Yoon | H01M 10/486 429/50 |
| 2012/0216999 | A1* | 8/2012 | Yamamoto | H01M 10/613 165/41 |
| 2013/0266840 | A1* | 10/2013 | Fujii | H01M 10/613 429/120 |
| 2013/0280574 | A1* | 10/2013 | Kim | H01M 10/6553 429/120 |
| 2014/0069113 | A1* | 3/2014 | Oh | H01M 10/6562 62/3.3 |
| 2014/0072844 | A1* | 3/2014 | Oh | H01M 10/6572 429/71 |
| 2014/0072846 | A1* | 3/2014 | Oh | H01M 10/6551 429/71 |
| 2015/0140375 | A1* | 5/2015 | Lee | H01M 50/204 429/62 |
| 2015/0357692 | A1* | 12/2015 | Piggott | H02J 7/0068 29/623.2 |
| 2016/0211561 | A1* | 7/2016 | Nakagawa | H01M 10/625 |
| 2017/0256831 | A1 | 9/2017 | Hong et al. | |
| 2019/0288359 | A1* | 9/2019 | Bass | H01M 10/613 |
| 2020/0212396 | A1 | 7/2020 | Chen et al. | |
| 2021/0057791 | A1* | 2/2021 | Harugaichi | B60L 50/66 |
| 2022/0131210 | A1* | 4/2022 | Botadra | H01M 10/6568 |
| 2022/0359947 | A1 | 11/2022 | Lee et al. | |

FOREIGN PATENT DOCUMENTS

| | | | |
|---|---|---|---|
| CN | 110420418 | A | 11/2019 |
| JP | 2000-153908 | A | 6/2000 |
| JP | 2000-188135 | A | 7/2000 |
| JP | 3261413 | B2 | 3/2002 |
| JP | 2011-254906 | A | 12/2011 |
| JP | 4901259 | B2 | 3/2012 |
| JP | 5074809 | B2 | 11/2012 |
| KR | 10-1584295 | B1 | 1/2016 |
| KR | 10-1652975 | B1 | 9/2016 |
| KR | 10-1706717 | B1 | 3/2017 |
| KR | 10-2050803 | B1 | 12/2019 |
| KR | 10-2020-0060869 | A | 6/2020 |
| KR | 10-2123685 | B1 | 6/2020 |
| KR | 10-2020-0080773 | A | 7/2020 |
| KR | 10-2154314 | B1 | 9/2020 |
| WO | WO 2017/154462 | A1 | 9/2017 |

OTHER PUBLICATIONS

International Search Report (PCT/ISA/210) issued in PCT/KR2021/012847 mailed on Jan. 6, 2022.

* cited by examiner

BATTERY RACK, ENERGY STORAGE SYSTEM, AND POWER GENERATION SYSTEM

TECHNICAL FIELD

The present disclosure relates to a battery rack, an energy storage system, and a power generation system, and more particularly, to a battery rack that is easy to install and assemble, an energy storage system, and a power generation system.

The present application claims priority to Korean Patent Application No. 10-2020-0128285 filed on Oct. 5, 2020 in the Republic of Korea, the disclosure of which is incorporated herein by reference.

BACKGROUND ART

Currently commercialized secondary batteries include nickel cadmium batteries, nickel hydrogen batteries, nickel zinc batteries, lithium secondary batteries, etc. Among these secondary batteries, because the lithium secondary batteries have almost no memory effect compared to nickel-based secondary batteries, the lithium secondary batteries have been spotlighted owing to advantages of free charging and discharging, a very low self-discharge rate, and a high energy density.

Such a lithium secondary battery mainly uses lithium-based oxides and carbon materials as positive electrode active materials and negative electrode active materials, respectively. The lithium secondary battery includes an electrode assembly in which a positive electrode plate and a negative electrode plate on which a positive electrode active material and a negative electrode active material are respectively coated are arranged with a separator interposed therebetween, and a sheath material, that is, a battery case, that seals and accommodates the assembly together with an electrolyte solution.

Recently, secondary batteries are widely used not only in small devices such as portable electronic devices but also in medium and large devices such as vehicles and energy storage systems (ESSs). When secondary batteries are used in such medium and large devices, a large number of secondary batteries are electrically connected in order to increase capacity and output power. In particular, pouch type secondary batteries are widely used in such medium large devices because of advantages such as easy lamination.

Meanwhile, as the need for a large-capacity structure, including its use as an energy storage source, recently increases, demand for a battery rack including a plurality of secondary battery cells electrically connected in series and/or parallel, a battery module accommodating the plurality of secondary battery cells therein, and a battery management system (BMS) is increasing.

In addition, it was common for such a battery rack to include a rack case made of a metal material to protect or store a plurality of battery modules from external impact. Moreover, as the demand for a high-capacity battery rack is increasing recently, the demand for a battery rack in which a plurality of battery modules of a heavy load is accommodated is increasing.

The battery pack or battery rack according to the related art has operated a fire facility when thermal runaway occurs in a secondary battery of each battery module or fire or explosion of the secondary battery occurs, cooled the secondary battery, or extinguished the fire.

For extinguishing the fire, a member spraying a fire extinguishing agent was provided in the battery rack. For example, the member spraying the fire extinguishing agent was configured by interconnecting a plurality of short pipes and a plurality of tees (connection units used to branch a main pipe) in accordance with a plurality of battery modules. However, the connection between the plurality of pipes and the plurality of tees takes a long time, and there was a problem in that manufacturing efficiency deteriorates, and airtightness between the plurality of pipes and tees easily deteriorates.

In addition, in designing the member spraying the fire extinguishing agent to fit various battery rack sizes, there was a problem in that design flexibility deteriorates, such as having to vary a length of the pipe each time.

Moreover, the member spraying the fire extinguishing agent in the related art had a problem in that it is difficult to fix the member to an accurate position in installing the member to match positions of a plurality of battery modules.

DISCLOSURE

Technical Problem

The present disclosure is designed to solve the problems of the related art, and therefore the present disclosure is directed to providing a battery rack that is easy to install and assemble, an energy storage system, and a power generation system.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery rack including a plurality of battery modules that are arranged in a layered structure; a rack case configured to accommodate the plurality of battery modules; and a fire extinguishing agent supply member including a supply pipe configured to transport a fire extinguishing agent and extending along the plurality of battery modules, and a plurality of valves, each valve of the plurality of valves configured to have a first end connected to the supply pipe and a second end connected to a respective one of the plurality of battery modules.

The fire extinguishing agent supply member may include at least one positioning pin protruding from the supply pipe toward the plurality of battery modules and configured such that a protruding end portion is inserted into a battery module of the plurality of battery modules.

The at least one positioning pin may include a locking protrusion protruding in a radial direction of the positioning pin.

The at least one positioning pin may be at least two positioning pins, and the at least two positioning pins may be configured to be spaced apart from each other by a predetermined distance.

The valve may be a passive valve configured to be opened when an internal temperature of the respective battery module rises above a predetermined temperature.

The fire extinguishing agent supply member may further include a fixing frame including a connection portion configured to be fixedly coupled to one side surface of the supply pipe, and a coupling portion bent and extending from the connection portion and configured to be coupled to the rack case.

The supply pipe may include an extension portion provided on a side opposite to a side to which the plurality of valves is coupled, and protruding rearward from a body.

The fixing frame may further include a bending portion formed integrally with the connection portion and bent in a U shape to surround the extension portion.

The supply pipe may be a pair of supply pipes, and the fixing frame may be configured to be positioned between the pair of supply pipes.

The fire extinguishing agent supply member may further include an injection nozzle connected to a first end of the pair of supply pipes so that the fire extinguishing agent is injected into the pair of supply pipes from an outside; and a discharge nozzle connected to a second end of the pair of supply pipes so that the fire extinguishing agent is discharged from the pair of supply pipes to the outside.

The fixing frame may further include a cover member configured to cover each of the injection nozzle and the discharge nozzle.

In another aspect of the present disclosure, there is provided an energy storage system including at least one battery rack described above.

In another aspect of the present disclosure, there is provided a power generation system including at least one battery rack described above.

Advantageous Effects

According to an aspect of the present disclosure, the battery rack of the present disclosure may supply a fire extinguishing agent to each of the plurality of battery modules through the fire extinguishing agent supply member. Thus, compared to the case of spraying the fire extinguishing agent to the outside of the battery module, the fire extinguishing agent may be directly sprayed to the inside of the battery module where a fire has occurred, thereby enabling efficient fire extinguishing. Accordingly, it is possible to significantly increase the fire safety of the battery rack.

Moreover, the fire extinguishing agent supply member may include the positioning pin, and thus the fire extinguishing agent supply member may be easily fixed to a previously set position of the battery module. Furthermore, it is possible to prevent the fire extinguishing agent supply member from being inserted in an incorrect position other than the set position of the battery module. Accordingly, the present disclosure may greatly increase the assembly efficiency of members.

Moreover, in the present disclosure, the supply pipe manufactured by extrusion molding does not require a separate tee configuration, and thus an operation of connecting the plurality of pipes and the plurality of tees may be omitted, and airtightness may not deteriorate in the pipe and tee connection part. In addition, the supply pipe manufactured by extrusion molding has the advantage of being cut to heights set to fit battery racks of various sizes.

MODE OF DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
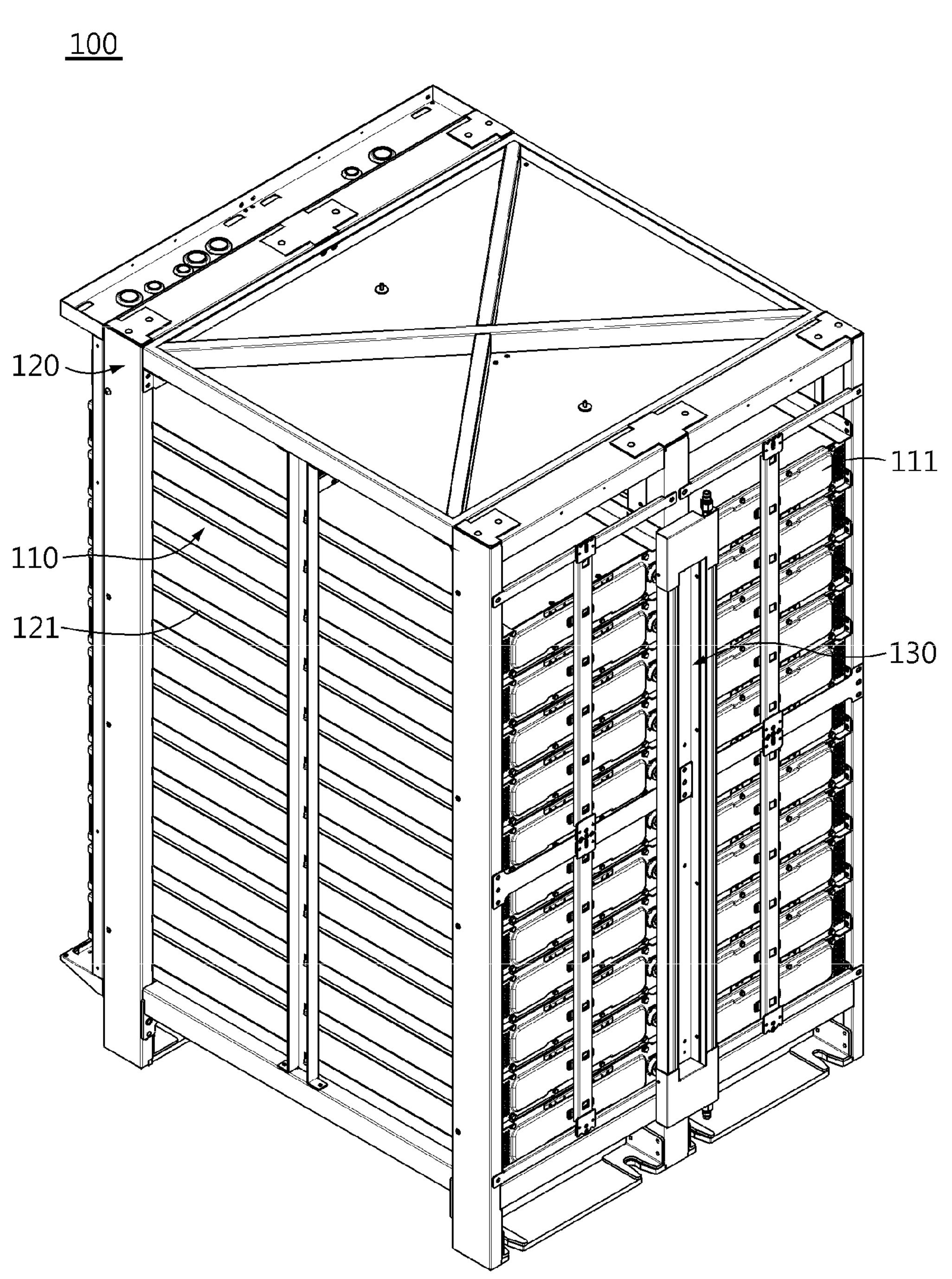
FIG. 1 is a rear perspective view schematically illustrating a battery rack according to an embodiment of the present disclosure.
Figure 2:
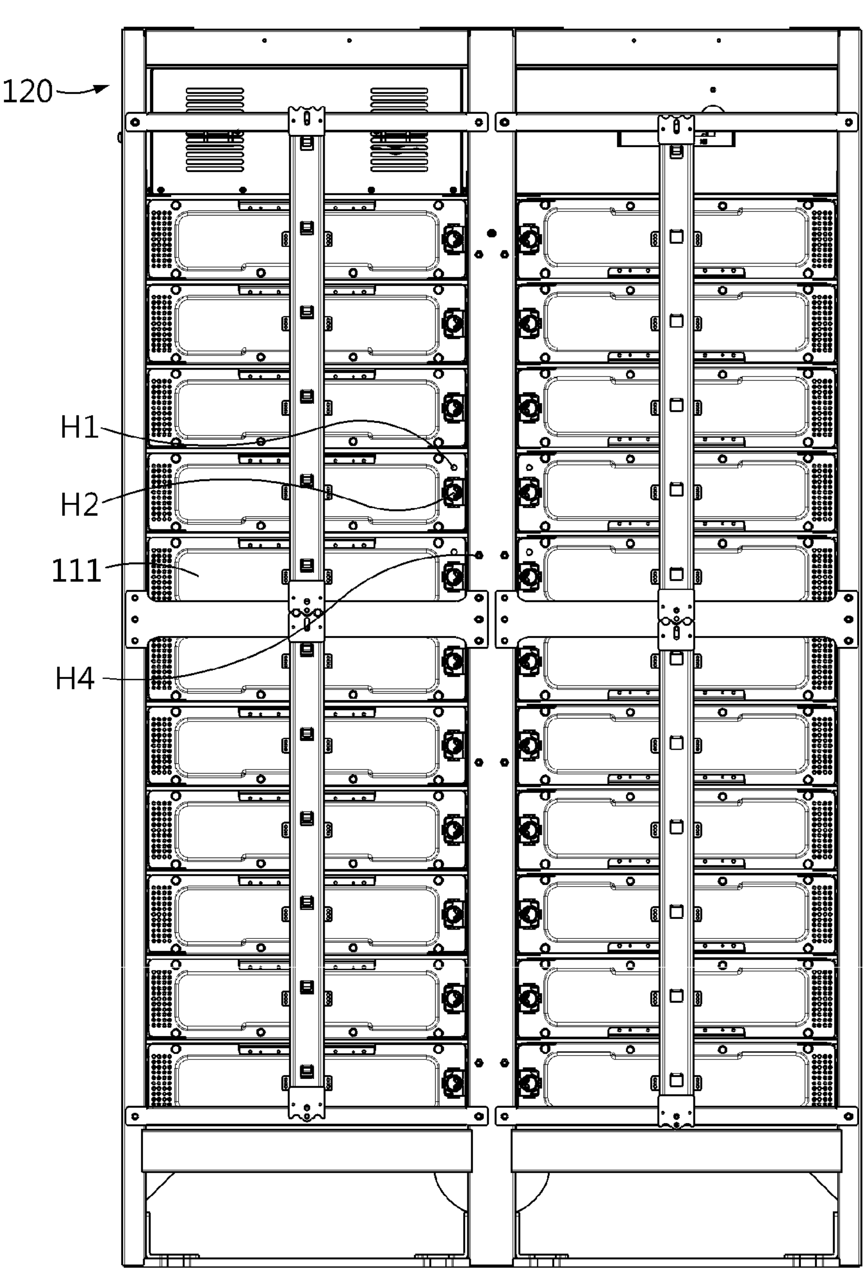
FIG. 2 is a rear view schematically illustrating a rack case of the battery rack from which a fire extinguishing agent supply member is removed according to an embodiment of the present disclosure.
Figure 3:
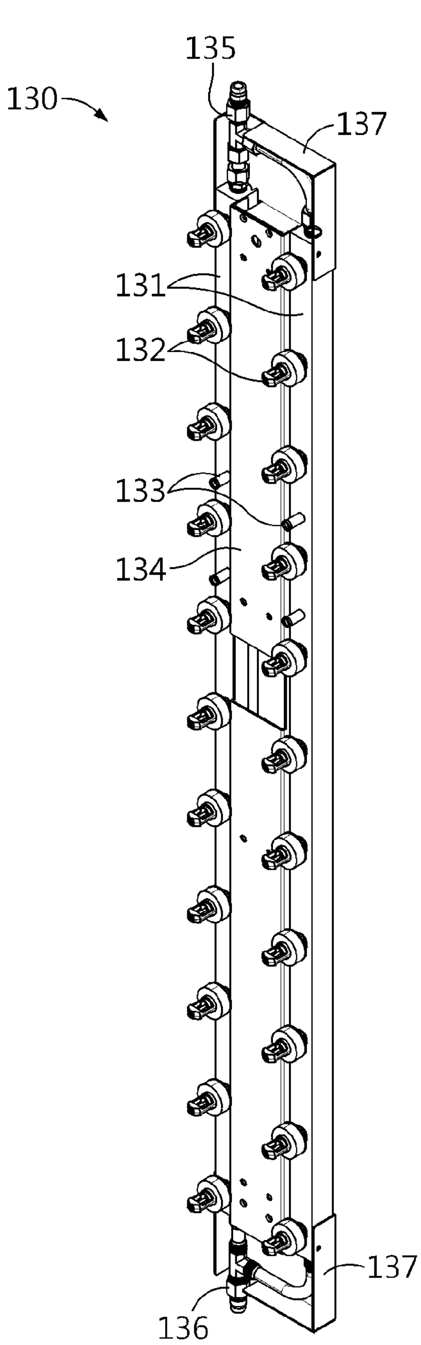
FIG. 3 is a perspective view illustrating the fire extinguishing agent supply member of the battery rack according to an embodiment of the present disclosure.
Figure 4:
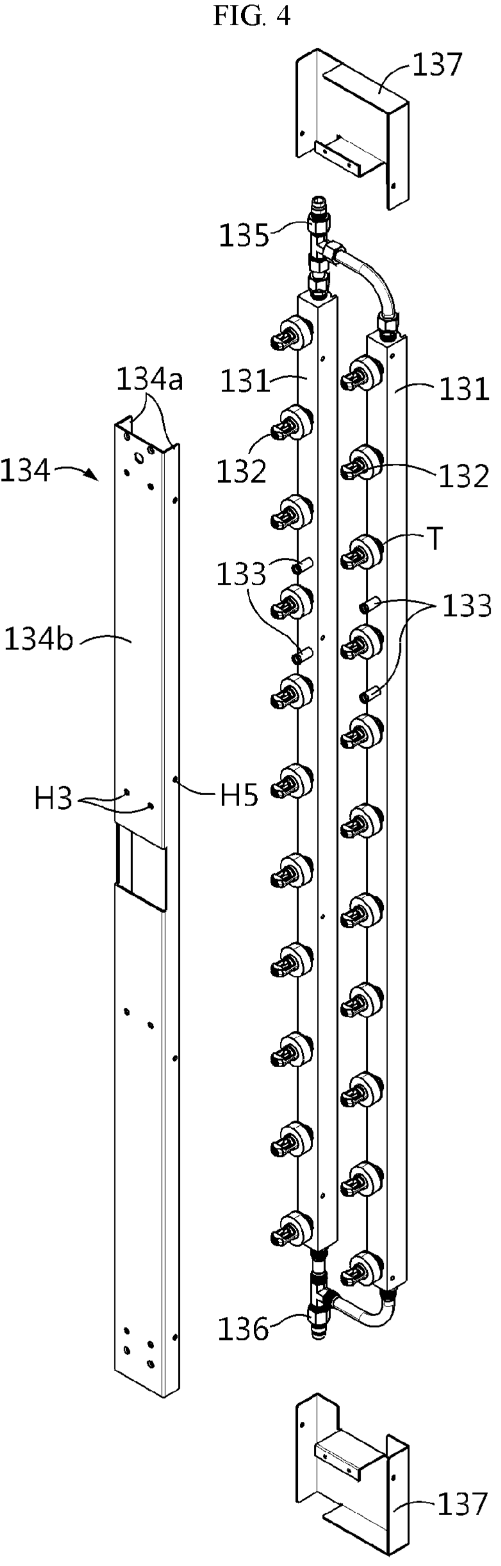
FIG. 4 is a partial exploded perspective view illustrating the fire extinguishing agent supply member of the battery rack according to an embodiment of the present disclosure.
Figure 5:
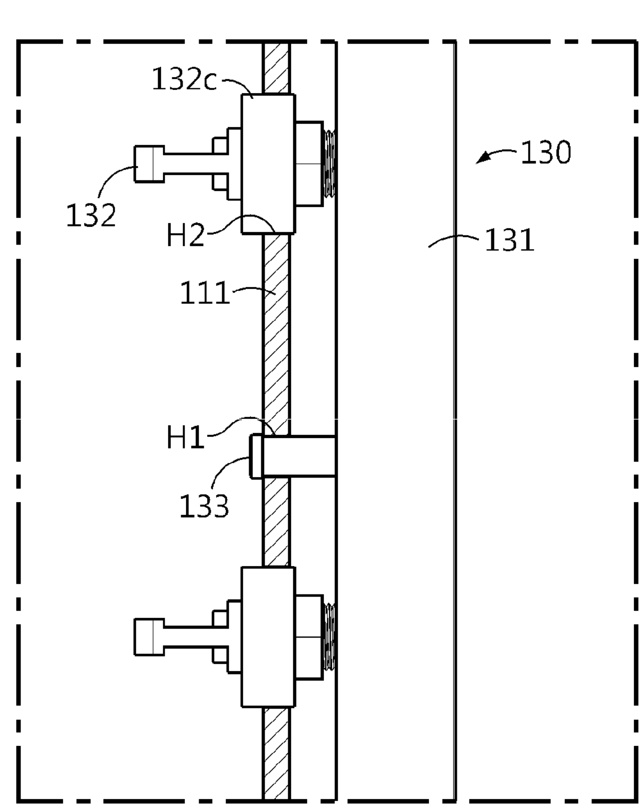
FIG. 5 is a partial cross-sectional view illustrating the fire extinguishing agent supply member coupled to a module housing of a battery module according to an embodiment of the present disclosure.

FIG. 1 is a rear perspective view schematically illustrating a battery rack according to an embodiment of the present disclosure, FIG. 2 is a rear view schematically illustrating a rack case of the battery rack from which a fire extinguishing agent supply member is removed according to an embodiment of the present disclosure, FIG. 3 is a perspective view illustrating the fire extinguishing agent supply member of the battery rack according to an embodiment of the present disclosure, FIG. 4 is a partial exploded perspective view illustrating the fire extinguishing agent supply member of the battery rack according to an embodiment of the present disclosure, and FIG. 5 is a partial cross-sectional view illustrating the fire extinguishing agent supply member coupled to a module housing of a battery module according to an embodiment of the present disclosure.

Referring to FIGS. 1 to 5, a battery rack 100 according to an embodiment of the present disclosure includes a plurality of battery modules 110 that are arranged in a layered structure, a rack case 120 configured to accommodate the plurality of battery modules 110, and a fire extinguishing agent supply member 130.

Specifically, the plurality of battery modules 110 may be accommodated in the rack case 120 so as to be arranged in a layered structure in an up-down direction. The battery module 110 may include a module housing 111 and a plurality of battery cells (not shown) provided inside the module housing 111 and stacked in one direction. For example, the battery cell may be a pouch-type battery cell.

However, the battery cell of the battery module 110 according to the present disclosure is not limited to the pouch-type battery cell described above, and various battery cells known at the time of filing of the present disclosure may be employed.

In addition, the rack case 120 may be configured to accommodate the plurality of battery modules 110 therein. For example, as shown in FIG. 1, the rack case 120 may include a plurality of receiving plates 121 to receive the one battery module 110. Two of the plurality of receiving plates 121 may be configured to support a lower end portion of the battery module 110 in a left-right direction in an upper direction. In addition, the two receiving plates 121 may serve as a stopper for preventing the other battery module 110 disposed below from moving in the upper direction.

Referring to FIGS. 1 and 3, the fire extinguishing agent supply member 130 may include a supply pipe 131, a plurality of valves 132, and a positioning pin 133.

Specifically, the supply pipe 131 may be configured to transport a fire extinguishing agent. That is, an inlet located in an upper portion of the supply pipe 131 may be configured to inject the fire extinguishing agent supplied from an external firefighting facility. Here, the fire extinguishing agent may be a concentrated solution of an inorganic salt such as potassium carbonate, chemical foam, air bubbles, carbon dioxide, or water. The supply pipe 131 may have a shape extending along the arrangement of the plurality of battery modules 110. For example, as shown in FIG. 1, the supply pipe 131 may have a shape extending in an up-down direction along the battery modules 110 arranged in the up-down direction.

The supply pipe 131 may be manufactured by extrusion molding. The supply pipe 131 may have a rectangular tube shape, as shown in FIG. 4. The supply pipe 131 may include a plurality of connection holes (T in FIG. 4) into which the plurality of valves 132 are inserted. The extrusion molded supply pipe 131 does not require a separate tee configuration, and thus it is possible to omit an operation of connecting a plurality of pipes and a plurality of tees. Moreover, airtightness may not deteriorate in a connection part of the pipe and the tee (here, the tee refers to a connection pipe connected to two pipes in an approximately T-shape when a main pipe is branched).

In addition, the supply pipe 131 manufactured by extrusion molding has the advantage of being cut to heights set to fit battery racks of various sizes.

The plurality of valves 132 may be configured such that one end portion is connected to the supply pipe 131. For example, a male screw may be formed in one end portion of the valve 132. One end portion of the valve 132 may be inserted into the connection hole T of the supply pipe 131 in which a female screw is formed and then screw-coupled, as shown in FIG. 5.

In addition, the other end portion of the valve 132 may have a shape protruding from the supply pipe 131 toward each of the plurality of battery modules 110. That is, the other end portion of the valve 132 may be configured to be inserted into an insertion hole H2 (see FIG. 2) of the module housing 111 of the battery module 110.

The positioning pin 133 may have a shape protruding from a front surface of the supply pipe 131 toward the front. The positioning pin 133 may have a shape protruding toward any one of the plurality of battery modules 110. A protruding end portion of the positioning pin 133 may be configured to be inserted into any one of the plurality of battery modules 110. At this time, among the plurality of battery modules 110, the module housing 111 of any one or more battery modules 110 may include a through hole H1 (see FIG. 2) into which the positioning pin 133 is inserted.

Therefore, according to such a configuration of the present disclosure, the battery rack 100 of the present disclosure may supply the fire extinguishing agent to each of the plurality of battery modules 110 through the fire extinguishing agent supply member 130. Thus, compared to the case of spraying the fire extinguishing agent to the outside of the battery module 110, the fire extinguishing agent may be directly sprayed to the inside of the battery module 110 where a fire has occurred, thereby enabling efficient fire extinguishing. Accordingly, it is possible to significantly increase the fire safety of the battery rack 100.

Moreover, the fire extinguishing agent supply member 130 may include the positioning pin 133, and thus the fire extinguishing agent supply member 130 may be easily fixed to a previously set position of the battery module 110. Furthermore, it is possible to prevent the fire extinguishing agent supply member 130 from being inserted in an incorrect position other than the set position of the battery module 110. Accordingly, the present disclosure may greatly increase the assembly efficiency of members.

Figure 6:
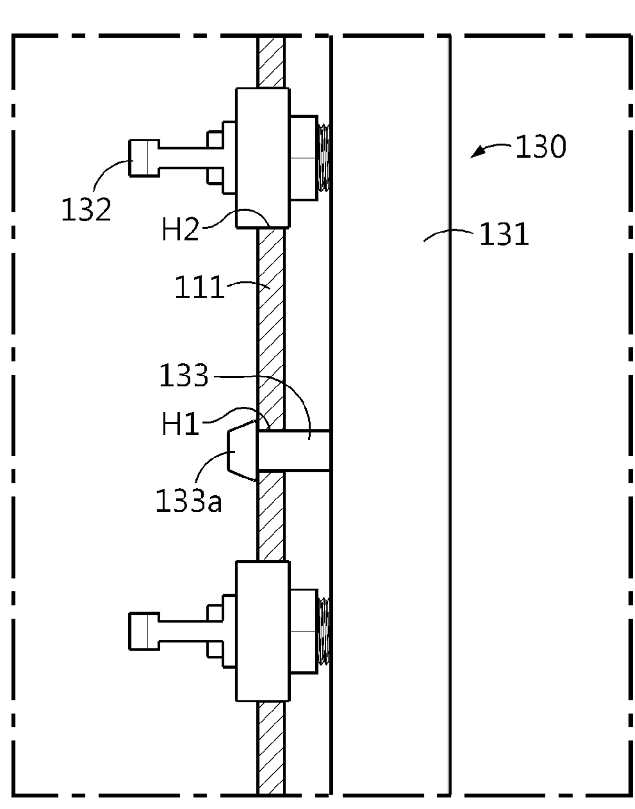
FIG. 6 is a diagram corresponding to FIG. 5 and illustrating a modified example of a positioning pin of the fire extinguishing agent supply member.

FIG. 6 is a diagram corresponding to FIG. 5 and illustrating a modified example of the positioning pin of the fire extinguishing agent supply member.

Referring to FIG. 6, the positioning pin 133 of the fire extinguishing agent supply member 130 according to the modified example may further include a locking protrusion 133*a*. The locking protrusion 133*a* may have a shape protruding from an outer surface of the positioning pin 133. When the positioning pin 133 is inserted into the through hole H1 of the module housing 111 of the battery module 110 and then moves in a discharge direction again, the locking protrusion 133*a* may be configured to be locked around a peripheral portion of the through hole H1. The locking protrusion 133*a* may be configured such that a thickness gradually increases. After the positioning pin 133 is inserted into the through hole H1 of the module housing 111, the locking protrusion 133*a* may be configured to move in an insertion direction again and prevent the positioning pin 133 from escaping from the through hole H1.

Therefore, according to such a configuration of the present disclosure, the positioning pin 133 further includes the locking protrusion 133*a*, and thus the fire extinguishing agent supply member 130 is fixed to a previously set position through the positioning pin 133 and then, the present disclosure may prevent the positioning pin 133 from escaping from the through hole H1 again by an external force. Accordingly, the present disclosure may greatly increase the assembly efficiency of members.

Referring back to FIGS. 3 and 4, two or more positioning pins 133 may be provided. The two or more positioning pins 133 may be configured to be spaced apart from each other by a predetermined distance. For example, as shown in FIG. 3, the fire extinguishing agent supply member 130 may include the two positioning pins 133 spaced apart from each other in the up-down direction. The two positioning pins 133 may be configured to be respectively inserted into the two battery modules 110.

Therefore, according to such a configuration of the present disclosure, the present disclosure includes the two or more positioning pins 133 spaced apart from each other by the predetermined distance, thereby preventing the fire extinguishing agent supply member 130 from shaking or moving in the left-right direction, after the fire extinguishing agent supply member 130 is fixed to the rack case 120. That is, when there is only one positioning pin 133, the supply pipe 131 may rotate and move with respect to the positioning pin 133, making it difficult to couple the fire extinguishing agent supply member 130 to the rack case 120, thereby preventing rotational movement of the supply pipe 131 using the two or more positioning pins 133 and guiding the supply pipe 131 to be regularly arranged in the up-down direction.

Figure 7:
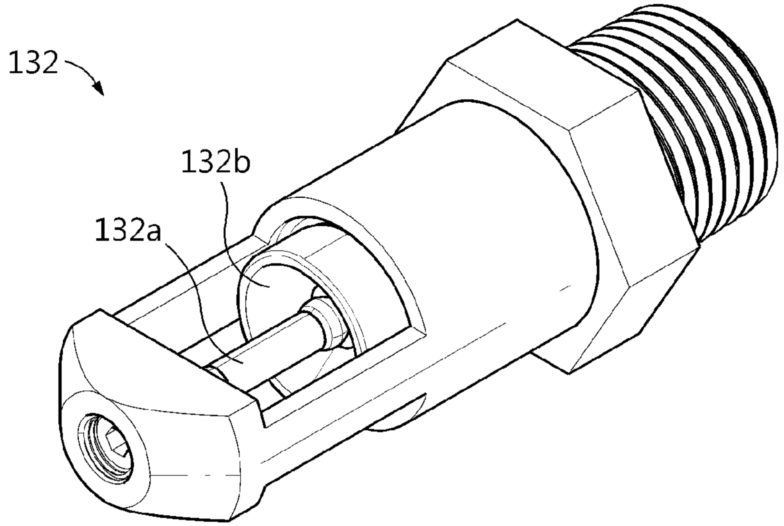
FIG. 7 is a perspective view of a valve of a supply member according to an embodiment of the present disclosure.

FIG. 7 is a perspective view of a valve of a supply member according to an embodiment of the present disclosure.

Referring back to FIG. 7 together with FIG. 5, the valve 132 of the present disclosure may be inserted into the insertion hole H2 provided in the battery module 110. At this time, the valve 132 may further include a sealing member 132*c* for sealing with the insertion hole H2. The sealing member 132*c* may be formed of, for example, synthetic rubber or silicone. Although not shown in detail, the sealing member 132*c* may be formed in a ring shape to surround an outer surface of the valve 132. The sealing member 132*c* may be interposed between the valve 132 and the insertion hole H2.

In addition, the valve 132 may be a passive valve 132. The passive valve 132 may be configured to be opened when the internal temperature of the battery module 110 rises above a predetermined temperature.

For example, the passive valve 132 may be configured as a glass bulb 132*a* configured to break above a predetermined temperature. The glass bulb 132*a* is configured to normally close an outlet 132*b* of the passive valve 132. However, when the glass bulb 132*a* is broken and lost due to heat, the outlet 132*b* of the valve 132 may be opened and a fire extinguishing agent may be ejected.

Figure 8:
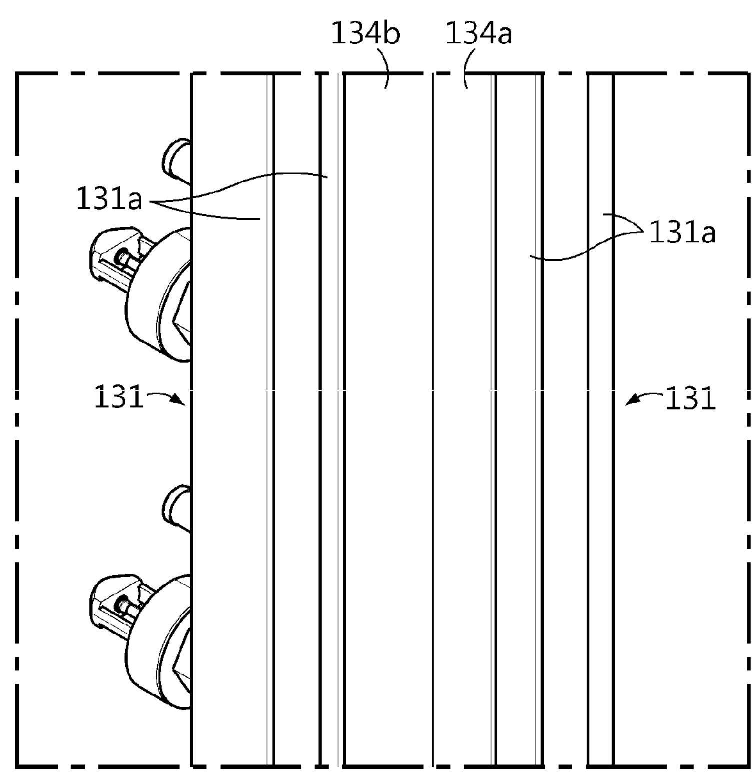
FIG. 8 is a partial rear perspective view illustrating a fixing frame of a fire extinguishing agent supply member and a supply pipe according to an embodiment of the present disclosure.

FIG. 8 is a partial rear perspective view illustrating a fixing frame of a fire extinguishing agent supply member and a supply pipe according to an embodiment of the present disclosure.

Referring back to FIGS. 2 to 4 and 8, the fire extinguishing agent supply member 130 of the present disclosure may further include a fixing frame 134. The fixing frame 134 may include a connection portion 134*a* and a coupling portion 134*b*. The connection portion 134*a* may be provided in a plate shape facing one side surface of the supply pipe 131. The connection portion 134*a* may be configured to be coupled to one side surface of the supply pipe 131 (here, one side surface of the supply pipe 131 refers to any one surface of the supply pipe 131 that intersects a surface to which the valve 132 is coupled).

For example, the connection portion 134*a* may include the supply pipe 131 and a bolt hole H5, and may be bolt-coupled to one side surface of the supply pipe 131 through the bolt hole H5. The coupling portion 134*b* may have a plate shape extending from the connection portion 134*a* and bent from an end portion of the connection portion 134*a*. The coupling portion 134*b* may be configured to be coupled to the rack case 120.

The coupling portion 134*b* may include a bolt hole H3 to be bolt-coupled to a bolt hole H4 (FIG. 2) formed in the rack case 120. For example, as shown in FIG. 4, the fire extinguishing agent supply member 130 may include the coupling portion 134*b* configured to be bolt-coupled to the rack case 120 and the two connection portions 134*a* bent rearward and extending rearward from each of both ends of the coupling portion 134*b* in a left-right direction. Also, the two connection portions 134*a* may be configured to be coupled to a pair of supply pipes 131, respectively.

Therefore, according to such a configuration of the present disclosure, the present disclosure further includes the fixing frame 134, thereby integrally fixing the pair of supply pipes 131 to the rack case 120 with a strong coupling force. Accordingly, the battery rack 100 of the present disclosure may effectively increase durability.

Figure 9:
FIG. 9 is a plan view for explaining a coupling configuration of a fixing frame of a fire extinguishing agent supply member and a supply pipe according to another embodiment of the present disclosure.

FIG. 9 is a plan view for explaining a coupling configuration of a fixing frame of a fire extinguishing agent supply member and a supply pipe according to another embodiment of the present disclosure.

Referring to FIG. 9 together with FIG. 8, the fixing frame 134 of the fire extinguishing agent supply member 130 of FIG. 9 may further include a bending portion 134*c* when compared to the fire extinguishing agent supply member 130 of FIG. 8. However, the remaining configurations are the same as those of the fire extinguishing agent supply member 130 of FIG. 8, and thus descriptions thereof will be omitted.

First, the supply pipe 131 of the fire extinguishing agent supply member 130 may be provided on the opposite side to a side to which the valve 132 is coupled, and further includes an extension portion 131*a* protruding in the shape of a rib rearward from a main body. The extension portion 131*a* may have the rib shape extending in an up-down direction. The extension portion 131*a* may be provided on each of left and right ends of the supply pipe 131.

In addition, the fixing frame 134 may further include the bending portion 134*c*. As shown in FIG. 9, the bending portion 134*c* may be provided to surround the extension portion 131*a*.

For example, the bending portion 134*c* may be formed integrally with the connection portion 134*a* and may be bent in an approximately U shape to surround the extension portion 131*a* of the supply pipe 131. In other words, the bending portion 134*c* may be configured to be hook-coupled to the connecting portion 134*a*. Specifically, as shown in FIG. 9, the fixing frame 134 may be positioned between the two supply pipes 131, and the left bending portion 134*c* and the right bending portion 134*c* of the fixing frame 134 may be connected to surround the extension portion 131*a* of one side of the two supply pipes 131.

Therefore, according to such a configuration of the present disclosure, the present disclosure further includes the bending portion 134*c* to which the fixing frame 134 and the supply pipe 131 may be bound to each other, thereby more firmly achieving binding between the supply pipe 131 and the fixing frame 134. Accordingly, the durability of the fire extinguishing agent supply member 130 of the present disclosure may be effectively increased.

Meanwhile, referring back to FIG. 3, the supply member 130 of the battery rack 100 according to an embodiment of the present disclosure may include an injection nozzle 135 and a discharge nozzle 136. Specifically, the injection nozzle 135 may be connected to an upper end of the supply pipe 131 so that a fire extinguishing agent supplied from an external extinguishing device is injected. In addition, the injection nozzle 135 may be configured to include one inlet and two outlets so as to be connectable to the two supply pipes 131.

The discharge nozzle 136 may be connected to a lower end of the supply pipe 131 to discharge the fire extinguishing agent inside the supply pipe 131 to the outside. In addition, the discharge nozzle may be configured to include two inlets and one outlet so as to be connectable to the two supply pipes 131.

In addition, the fixing frame 134 may further include a cover member 137. The cover member 137 may be configured to cover each of the injection nozzle 135 and the discharge nozzle 136. The cover member 137 may include a rear wall covering a rear surface of the injection nozzle 135 or the discharge nozzle 136, a left wall covering a left side of the injection nozzle 135 or the discharge nozzle 136, a right wall covering a right side of the nozzle, and a lower wall covering a lower portion of the nozzle.

Accordingly, according to such a configuration of the present disclosure, the present disclosure the cover member 137 configured to cover the injection nozzle 135 or the discharge nozzle 136, thereby preventing the injection nozzle 135 or the discharge nozzle 136 from being damaged by a collision of an external object. Accordingly, the battery rack 100 of the present disclosure may protect the fire extinguishing agent supply member 130 from colliding with the external object, thereby effectively increasing durability.

Meanwhile, an energy storage system (not shown) according to the present disclosure may include one or more battery racks 100 described above. The energy storage system may be implemented in various forms, such as a smart grid system or an electric charging station.

Meanwhile, the present disclosure provides a power generation system including at least one battery rack 100. The power generation system may include a hydro power generator, a thermal power generator, a wind power generator, a solar generator, etc. Electricity generated from such a generator may be stored in the battery rack 100.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, although the terms indicating directions such as up, down, left, right, front, and back are used herein, these terms are only for convenience of description, and it is obvious to one of ordinary skill in the art that the terms may vary depending on the location of a target object or the location of an observer.

What is claimed is:

1. A battery rack comprising:
- a plurality of battery modules that are arranged in a layered structure;
- a rack case configured to accommodate the plurality of battery modules; and
- a fire extinguishing agent supply member comprising:
  - a supply pipe configured to transport a fire extinguishing agent and extending along the plurality of battery modules;
  - a plurality of valves, each valve of the plurality of valves configured to have a first end connected to the supply pipe and a second end connected to a respective one of the plurality of battery modules; and
  - at least one positioning pin protruding from the supply pipe toward the plurality of battery modules and configured such that a protruding end portion is inserted into a battery module of the plurality of battery modules.

2. The battery rack of claim 1, wherein the at least one positioning pin comprises a locking protrusion protruding in a radial direction of the positioning pin.

3. The battery rack of claim 1, wherein the at least one positioning pin is at least two positioning pins, and the at least two positioning pins are configured to be spaced apart from each other by a predetermined distance.

4. The battery rack of claim 1, wherein each of the plurality of valves is a passive valve configured to be opened when an internal temperature of a respective battery module rises above a predetermined temperature.

5. The battery rack of claim 1, wherein the fire extinguishing agent supply member further comprises a fixing frame comprising a connection portion configured to be fixedly coupled to one side surface of the supply pipe, and a coupling portion bent and extending from the connection portion and configured to be coupled to the rack case.

6. The battery rack of claim 5, wherein the supply pipe comprises an extension portion provided on a side opposite to a side to which the plurality of valves is coupled, and protruding rearward from a body.

7. The battery rack of claim 6, wherein the fixing frame further comprises a bending portion formed integrally with the connection portion and bent in a U shape to surround the extension portion.

8. The battery rack of claim 5, wherein the supply pipe is a pair of supply pipes, and
- wherein the fixing frame is configured to be positioned between the pair of supply pipes.

9. The battery rack of claim 8, wherein the fire extinguishing agent supply member further comprises:
- an injection nozzle connected to a first end of the pair of supply pipes so that the fire extinguishing agent is injected into the pair of supply pipes from an outside; and
- a discharge nozzle connected to a second end of the pair of supply pipes so that the fire extinguishing agent is discharged from the pair of supply pipes to the outside.

10. The battery rack of claim 9, wherein the fixing frame further comprises a cover member configured to cover each of the injection nozzle and the discharge nozzle.

11. An energy storage system comprising at least one battery rack according to claim 1.

12. A power generation system comprising at least one battery rack according to claim 1.

13. The battery rack of claim 1, wherein each of the plurality of valves extends into one of the plurality of battery modules.

14. The battery rack of claim 1, wherein the plurality of battery modules are stacked in a vertical direction, and
- wherein the at least one positioning pin is spaced from the plurality of valves in the vertical direction.

15. The battery rack of claim 1, wherein the plurality of battery modules are stacked in a vertical direction,
- wherein the supply pipe extends in the vertical direction, and
- wherein the at least one positioning pin is between two of the plurality of valves in the vertical direction.

* * * * *